(12) United States Patent
McCracken

(10) Patent No.: US 11,553,727 B1
(45) Date of Patent: Jan. 17, 2023

(54) PORK RIND DERIVED LOW CARBOHYDRATE COMPOSITIONS AND METHODS

(71) Applicant: Sean McCracken, Ruidoso, NM (US)

(72) Inventor: Sean McCracken, Ruidoso, NM (US)

( * ) Notice: Subject to any disclaimer, the term of this patent is extended or adjusted under 35 U.S.C. 154(b) by 0 days.

(21) Appl. No.: 16/711,097

(22) Filed: Dec. 11, 2019

Related U.S. Application Data

(63) Continuation-in-part of application No. 15/137,635, filed on Apr. 25, 2016, now abandoned.

(60) Provisional application No. 62/151,787, filed on Apr. 23, 2015.

(51) Int. Cl.
| | |
|---|---|
| *A23L 13/10* | (2016.01) |
| *A23L 13/20* | (2016.01) |
| *A21D 8/02* | (2006.01) |
| *A23L 13/40* | (2016.01) |

(52) U.S. Cl.
CPC .............. *A23L 13/20* (2016.08); *A21D 8/02* (2013.01); *A23L 13/428* (2016.08)

(58) Field of Classification Search
CPC ....... A23L 13/20; A23L 13/428; A23K 40/20; A23K 40/25; A21D 8/02
See application file for complete search history.

(56) References Cited

U.S. PATENT DOCUMENTS

| | | | |
|---|---|---|---|
| 2,562,850 A | 7/1951 | Winslow | |
| 4,119,742 A | 10/1978 | Stupec | |
| 4,262,028 A | 4/1981 | Meyer et al. | |
| 4,615,889 A | 10/1986 | Lu et al. | |
| 8,227,008 B1 | 7/2012 | Radatti et al. | |
| 2007/0218107 A1 | 9/2007 | Schnur et al. | |

FOREIGN PATENT DOCUMENTS

| | | | |
|---|---|---|---|
| AT | 293843 | | 10/1971 |
| DE | 1952955 A1 | * | 7/1970 |
| DE | 60215194 T2 | | 8/2007 |
| EP | 0206819 A2 | | 12/1986 |
| ES | 2301276 A1 | | 6/2008 |
| MX | PA97005204 A | | 7/2002 |

OTHER PUBLICATIONS stefangourmet.com Homemeade Corn Tortillas and Hard Taco Shells Mar. 16, 2014 https://stefangourmet.com/2014/03/16/homemade-corn-tortillas-and-hard-taco-shells/ (Year: 2014).*
theprimitivepalate.com Pork Rind Tortillas Feb. 8, 2015 https://theprimitivepalate.com/2015/02/08/pork-rind-tortillas/ (Year: 2015).*
"Pork Skin Collagen (Regular Fine Powder)", https://www.ulprospector.com/en/na/Food/Detail/14051/359182/Pork-Skin-Collagen-Regular-Fine-Powder (citing to http://nutrafoodingredients.com/products/collagen-nutracollegen/pork-collagen-hydrolyzed-pork-gelatin first published Dec. 14, 2013), Dec. 14, 2013.
Volek, Jeff Ph.D., R.D., "Genius Junk Food: 6 Snacks That Are Actually Good for You", http://www.huffingtonpost.com/2008/07/15/genius-junk-food-6-snacks_n_112903.html (citing to Men's Health Magazine, Apr. 2006, p. 87), Apr. 2006.

* cited by examiner

*Primary Examiner* — Vera Stulii
(74) *Attorney, Agent, or Firm* — Peacock Law P.C.; Justin R. Muehlmeyer

(57) ABSTRACT

Compositions of and methods for producing a curve-shaped low carbohydrate composition, including taco shell, tostada, and taco salad bowl shapes.

14 Claims, 2 Drawing Sheets

PORK RIND DERIVED LOW CARBOHYDRATE COMPOSITIONS AND METHODS

CROSS-REFERENCE TO RELATED APPLICATIONS

This application is a continuation-in-part application of U.S. patent application Ser. No. 15/137,635, entitled "Pork Rind Derived Low Carbohydrate Compositions", filed Apr. 25, 2016, which claims priority to and the benefit of the filing of U.S. Provisional Patent Application Ser. No. 62/151,787, entitled "Pork Rind Derived Low Carbohydrate Compositions", filed on Apr. 23, 2015, and the specifications thereof are incorporated herein by reference.

BACKGROUND OF THE INVENTION

Field of the Invention (Technical Field):

Embodiments of the present invention relate to food compositions, more particularly, to fried pork skin food compositions and methods of manufacturing the same.

Description of Related Art:

Consumption of excess carbohydrates in an individual's diet can result in obesity, diabetes, heart disease, etc. Current diet trends advise people trying to lose weight to cut down on consumption of carbohydrates, i.e., eat "low-carb" foods. A low-carb diet limits carbohydrates, such as those found in grains, starchy vegetables and fruit, and emphasizes foods high in protein and fat. This makes it challenging for people who enjoy, for example, Mexican dishes such as crispy tacos, tostadas, and taco salads because ordinary taco shells, tostadas, taco salad bowls, and the like, are made primarily from grain flours such as corn, wheat, etc., which are very high in carbohydrates. There is a need and high demand for low-carb, crunchy foods that can substitute for conventional taco shells, tostadas, taco salad bowls, and the like.

Currently, there is no known method of manufacturing shaped shells that are of low carbohydrate compositions. Low carbohydrate compositions are based on protein substances like meat, and meats tend to be high in fat and other substances. Such compositions have, until the present invention, posed serious problems when food producers try to cook them into any shapes that require molding or folding, such as into a bowl, taco or tostada-like shape, because the gelatinous and fat containing compositions of prior methods do not react well to heat: they explode or are simply too difficult to form into shape due to its consistency. Water added to oil under temperature explodes and/or distorts the shape of the composition. What is needed is a method of manufacturing low carbohydrate shells that are shapeable into curved shapes, including but not limited to snack rounds, taco shells, tostada chips, bowls, etc.

BRIEF SUMMARY OF THE INVENTION

Embodiments of the present invention comprise low carbohydrate taco shells, tostadas, and taco salad bowls formed of pork skin and other animal parts and methods of producing the same. Embodiments of the method of the present invention making pork skin-based shapes such as taco shells, tostadas and taco bowls has received promising industrial attention and development because this method enables food manufacturers to create such shaped snacks from a low carbohydrate composition that, until now, was not shapeable.

Embodiments of the present invention solve the problems of the traditional methods described above by providing low-carb food compositions made directly from, or derived from, fried pork skin, which has high protein content and a very low amount of carbohydrates.

Embodiments of the present invention are directed to a method for producing a curve-shaped low carbohydrate composition comprising: obtaining a low carbohydrate powder; forming a low carbohydrate dough by adding, to the low carbohydrate powder, water at a temperature of about 20 degrees Celsius to about 100 degrees Celsius, in an amount that turns the powder into a dough; mixing the low carbohydrate dough in a mixing apparatus at a temperature of about 20 degrees Celsius to about 90 degrees Celsius; separating the low carbohydrate dough into individual dough units; pressing the individual dough units; shaping the individual dough units into a curved shape; and cooking the curved shape individual dough units.

In one embodiment of the method for producing a curve-shaped low carbohydrate composition, the step of obtaining a low carbohydrate powder comprises grinding a low carbohydrate food product. In another embodiment, the low carbohydrate food product is cooked prior to the step of obtaining a low carbohydrate powder. In another embodiment, the water is at a temperature of between about 50 degrees Celsius to about 60 degrees Celsius. In another embodiment, the mixing apparatus is at a temperature of about 60 degrees Celsius to about 80 degrees Celsius. In another embodiment, the step of pressing the individual dough units further comprises pressing the individual dough units into a flat shape having a thickness. In another embodiment, the thickness of the flat shape is between about three millimeters to about four millimeters. In another embodiment, the step of shaping the individual dough units into a curved shape further comprises placing the individual dough units into a shaping apparatus of a curved shape. In another embodiment, the shaping apparatus is at a temperature of about 60 degrees Celsius to about 80 degrees Celsius. In another embodiment, the curved shape is one selected from the group consisting of taco shells, tostadas and taco bowls. In another embodiment, the step of cooking comprises baking. In another embodiment, the baking occurs at a temperature of about 225 degrees Celsius to about 250 degrees Celsius for between about 15 minutes to about 25 minutes. In another embodiment, seasoning is added. In another embodiment, a food preservative is added. In another embodiment, the mixing apparatus and shaping apparatus are at about the same temperature as each other and above about 20 degrees Celsius or above about room temperature. In another embodiment, the same temperature of the dough and individual dough units is maintained through each of the steps of mixing the dough, separating the dough into individual dough units, pressing the individual dough units, and shaping the individual dough units.

Embodiments of the present invention are also directed to a low carbohydrate composition produced by the method for producing a curve-shaped low carbohydrate composition described in the previous paragraphs. In one embodiment of the low carbohydrate composition, the curved shape is one of the shapes selected from the group consisting of taco shells, tostadas and taco bowls.

Embodiments of the present invention are also directed to a method for producing a curve-shaped low carbohydrate composition comprising: obtaining a low carbohydrate powder produced from a cooked low carbohydrate food product; forming a dough by adding, to the low carbohydrate powder, water at a temperature of about 50 degrees Celsius to about 60 degrees Celsius, in a ratio of powder to water of about one pound of powder to about 500 ml to 600 ml of water; mixing the dough in a mixing apparatus at a temperature of about 60 degrees Celsius to about 80 degrees Celsius; separating the dough into individual dough units comprising a diameter of about one inch to about two inches; pressing the individual dough units of the dough to form a flat shape having a thickness that is about three millimeters to about four millimeters, and having a diameter or a length of about four inches to about five inches; shaping the individual dough units into a curved shape by placing the individual dough units into a shaping apparatus of a curved shape at a temperature of about 50 degrees Celsius to about 60 degrees Celsius; and baking the individual dough units, preferably by baking at a temperature of about 225 degrees Celsius to about 250 degrees Celsius, for about 15 minutes to about 25 minutes. In another embodiment, the baked individual dough units have a moisture content of between about 1.5% and about 3.5%.

In one embodiment, low carbohydrate taco shells, tostadas, and taco salad bowls are produced from raw pork skin by cutting the pork skin into segments, forming the segments into a taco, tostada, or bowl shape, deep-frying the shaped segments, and cooling the deep-fried shaped segments. In another embodiment, low carbohydrate taco shells, tostadas, and taco salad bowls are produced from fried pork skin by grinding the fried pork skin to form a powder, adding a hydrating liquid to said powder to form a paste, forming the paste into a taco, tostada, or bowl shape, frying the shaped paste, and cooling the fried and shaped paste. In another embodiment, low carbohydrate taco shells, tostadas, and taco salad bowls are produced from any high-collagen animal parts by blending the animal parts to form a semi-gelatinous solid, pressing the solid through a shaped body to shape the solid, slicing the shaped solid to form at least one segment of the solid, forming the segment into a shape, deep-frying the shaped segment, and cooling the fried segment.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE INVENTION

Figure 1:
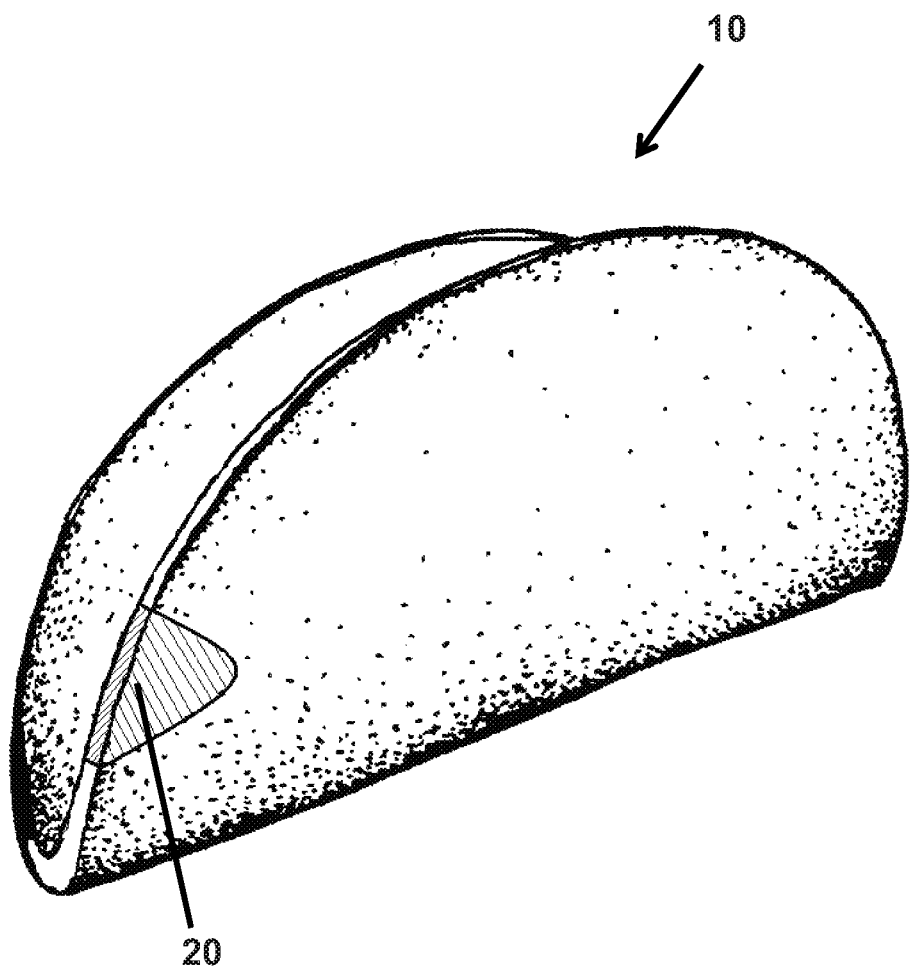
FIG. 1 is an isometric illustration of an embodiment of the present invention in the shape of a taco shell with a cut-away view.

In the following detailed description, numerous specific details are set forth in order to provide a thorough understanding of the embodiments of the invention. However, upon studying this application, it will be understood by one of ordinary skill in the art that the embodiments may be practiced without these specific details. For instance, well known procedures or techniques may not be shown in detail. Technical and scientific terms used in this description have the same meaning as commonly understood to one of ordinary skill in the art to which this subject matter belongs.

As used throughout this specification, the terms "curved shape" or "curve-shaped" shall mean any shape that comprises a curvature, that is, which is not completely flat, including but not limited to taco shells, tostadas, bowls, snack rounds, folds, etc., or that is at least purposely intended to comprise a curvature. The term "flat" or "flat shape" shall mean an object with no curvature, or that is at least predominantly without a curvature.

The terms "low carbohydrate" and "low-carb" and "low carbohydrate food product" shall mean any composition or food product that contains protein, including but not limited to compositions or foods that are higher in protein and fat than carbohydrates, and in any form, including but not limited to rinds, pellets, skins, scratchings, cracklings, and of any animal meat, including but not limited to pork, beef, poultry, fish, and of any plant material, and any combinations of the foregoing. The term "low carbohydrate" and "low-carb" and "low carbohydrate food product" may be informed or defined by caloric measurement, in particular a low caloric quality of the composition or food relative to other foods, as for example shown by the results of one of the examples described herein. While the term "low carbohydrate food product" can include raw food, one of the objectives of various embodiments of the present invention is to use low carbohydrate food products that have already been processed to some extent, for example, already cooked food products, including but not limited to fried pork skins, pork rinds, etc. The term "cook" shall mean any method of increasing the temperature of a food, including but not limited to baking, roasting, frying, deep frying, microwaving, etc. The term "baking" shall not be limited to a particular type of baking, but is intended to be interpreted in the broadest meaning of that word, including but not limited to conventional baking, convection baking, etc. with any type of oven, unless otherwise specified.

As used throughout this specification, the terms "dough" and "paste" are used interchangeably and shall refer to the same state of matter or of a composition that is malleable and/or kneadable or that maintains its shape. The term "powder" shall mean matter or a composition having the form of dry granular particles that is not gelatinous, not a paste nor a dough.

As used throughout this specification, the term "heated" means to increase the temperature of the object, which can be accomplished in any way, including but not limited to conduction, induction, radiation, convection, etc., above the temperature the object was at prior to heating or above about room temperature (about 20 degrees Celsius).

Fried, puffed pork skins, or "pork rinds," are a common snack. They are conventionally prepared by cutting pork skins into strips, rendering (applying heat to melt fat away and release moisture), and deep-fat frying at high temperatures until they are puffed. As used throughout this specification, the term "pork skins" is defined to include not only the conventional green pork skin, but rendered pork skin and bacon or ham rinds, unless otherwise specifically noted.

Figure 2:
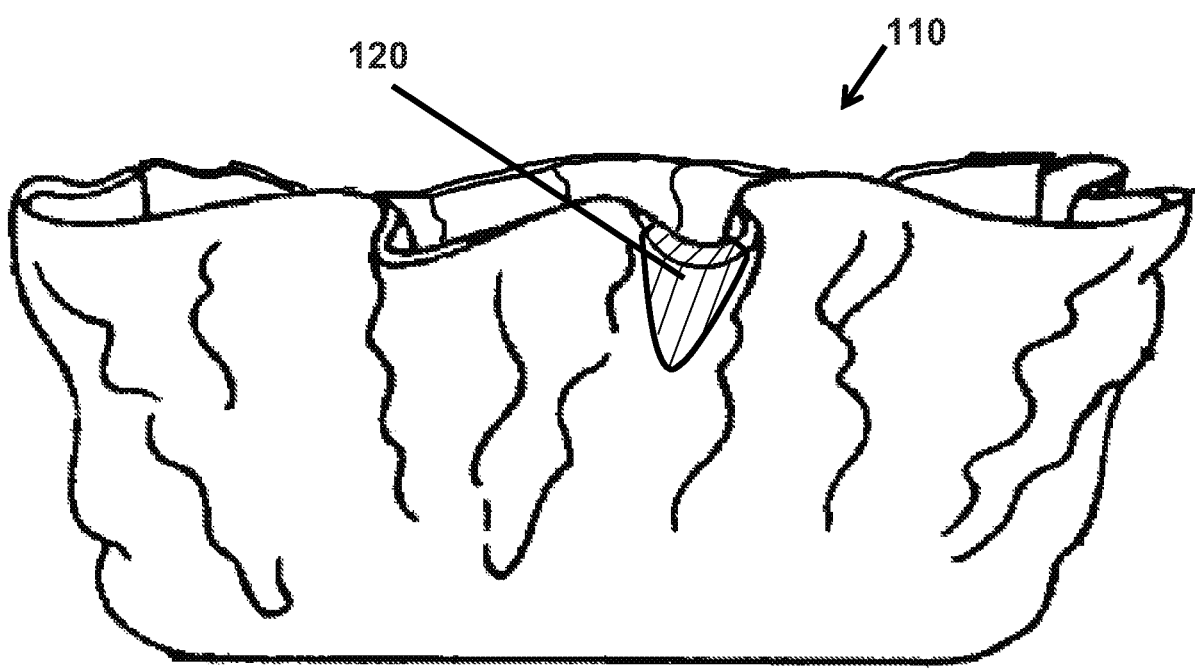
FIG. 2 is an illustration of an embodiment of the present invention in the shape of a taco bowl with a cut-away view.

FIG. 1 illustrates an embodiment of the present invention in the shape of a taco shell 10 formed of processed pork skin 20. FIG. 2 illustrates an embodiment of the present invention in the shape of a taco bowl shell 110 formed of processed pork skin 120. In one embodiment of the present invention, pork rind taco shells, tostadas, taco salad bowls, and the like, are made directly from raw ("green") pork skins. Preferably, skins removed from slaughtered pigs are preferably refrigerated (or frozen) and are preferably provided directly from slaughter houses in precut large segments, for example, roughly one-by-three-foot rectangles. The pork skins are preferably subsequently disposed on a flat surface and segments are cut out. The shapes of the segments can vary, depending on the desired product. In one embodiment, the skins are disposed on a conveyer belt and held flat with, for example, rollers or the like, as a die preferably cuts segments, preferably of circular shape. Preferably, when the segments are cut into circular shapes, the leftover matrix is used for other products, by for example, dicing it into small segments such as pellets. Optionally, the skins are cut into square/rectangular segments (as opposed to circular) for non-circular taco shells, tostadas, etc. In one embodiment, the rectangular segments are between approximately 2 and approximately 6 inches long and between approximately 1.5 and approximately 5 inches wide, for example.

In one embodiment, the pork skin segments are optionally dehydrated, and optionally rendered to, for example, remove some moisture and fat. In a preferred embodiment, the pork skin segments are bent along a central axis and pressed and held in a "taco shell" shape as they are deep fried to form taco shells. Since green pork skin typically curls and shrinks when fried, the segments are molded and pressed and held with, for example, clamps, rods, metal mesh or heat resistant nets, etc., or are planted in a mold in a manner which allows the skin to be shaped into the desired product and with enough room for it to puff up (or become thicker). In one embodiment, the pork skin segments are preferably pressed and held into a bowl shape as they are deep fried to make taco salad bowls. If the segments are square/rectangular, then the central axis for the bend is preferably lengthwise for making rectangular taco shells.

In another embodiment, the segments are only pressed flat to be deep fried to form tostadas. Preferably, the taco shells, tostadas, taco salad bowls, and the like, puff up and turn crispy during deep frying. After the products cool down, they are optionally seasoned, and preferably packaged for sale. Optionally, a food preservative is added during the process.

In another embodiment, a low carbohydrate food product, preferably pork rinds, is ground to form a powder starting material. Preferably, the low carbohydrate food product was already made through any process, that is, it was pre-cooked. The powder forms a paste when hydrated. The paste is processed similarly to corn dough to make taco shells, tostadas, taco salad bowls, and the like. Optionally, other low-carb ingredients are added to the paste to improve consistency, stickiness, texture, flavor, etc., for example, spices, eggs, cheese, etc.

In another embodiment, raw pig skin cut in any shape is mixed and/or blended and processed to form a semi-gelatinous solid composition. This composition is then pressed and shaped, for example, in a cylindrical body with, for example, a die-ended screw-type extruder having thermally-controllable barrel sections along the screw, and that yields circular, tortilla-like slices when sliced that are preferably bent along a central axis and pressed and held in a "taco shell" shape as they are deep fried to form puffed taco shells. In one embodiment, the slices are preferably pressed and held into a bowl shape as they are deep fried to make taco salad bowls. Optionally, the shape of the body is rectangular for square/rectangular slices that are preferably bent lengthwise along a central axis to make taco shells. Note that this process can be carried out using other animal parts with or without pork skin, as long as they contain enough collagen and can gelatinize to be extruded.

One of the objectives of embodiments of the present invention is to provide a method of making and a composition of low carbohydrate food products that are actually shapeable and capable of mass manufacture. The temperatures of the various surfaces in contact with the composition become significant, as well as the temperatures of the ingredients that form the composition, for the composition to actually be shapeable into curved shapes on a mass scale. In one embodiment, a method of producing a low carbohydrate composition from a low carbohydrate food product comprises the steps of: forming a powder from a low carbohydrate food product, including by grinding, smashing, dicing, straining, or otherwise powderizing; forming a dough by adding, to the powder, water at a temperature of preferably about 20 degrees Celsius to about 100 degrees Celsius, but more preferably about 40 degrees Celsius to about 80 degrees Celsius, and most preferably about 50 degrees Celsius to about 60 degrees Celsius; mixing the dough in a mixing apparatus at a temperature of preferably about 10 degrees Celsius to about 100 degrees Celsius, more preferably about 20 degrees Celsius to about 90 degrees Celsius, and most preferably about 60 degrees Celsius to about 80 degrees Celsius; separating the dough into individual dough units, preferably balls having a diameter of preferably about an eighth of an inch to about ten feet, more preferably about a half of an inch to about four inches and most preferably about one inch to about two inches; pressing the individual dough units of the dough to form a flat shape, including but not limited to a circle, rectangle, square, triangle, having a thickness that is preferably about half a millimeter to about 50 millimeters, more preferably about one millimeter to about ten millimeters and most preferably about three millimeters to about four millimeters, and having a diameter (if the dough units are circular) or a length (if square or rectangular) of preferably about an eighth of an inch to about ten inches, more preferably about two inches to six inches and most preferably about four inches to five inches; shaping the individual dough units by placing the individual dough units into a shaping apparatus of a desired shape, preferably a curved shape, the shaping apparatus preferably at about 10 degrees Celsius to about 100 degrees Celsius, more preferably about 20 degrees Celsius to about 90 degrees Celsius, and most preferably about 60 degrees Celsius to about 80 degrees Celsius; cooking the individual dough units, preferably with the dough units still in the shaping apparatus, and preferably by baking at a temperature of preferably about 100 degrees Celsius to 450 degrees Celsius, more preferably about 200 degrees Celsius to about 400 degrees Celsius, and most preferably about 225 degrees Celsius to about 250 degrees Celsius, the amount of time depending on the temperature until the desired crunchiness, but preferably about two minutes to about 60 minutes, more preferably about 7 minutes to about thirty minutes and most preferably about 15 minutes to about 25 minutes. The foregoing steps are preferably performed in the order described above, but as described in what follows, various other steps can additionally be performed or the steps can be modified to enhance the final product.

Preferably, the step of forming a dough by adding, to the powder, water comprises adding water in the following proportions. In one embodiment, about 530 ml of water is added to about one pound of powder. Preferably, one pound of powder receives between about 100 ml of water to 1,000 ml of water, more preferably between about 300 ml of water to 750 ml of water, and most preferably about 500 ml to 600 ml of water.

In one embodiment, the step of forming a powder can additionally comprise whisking the powder through a strainer to separate fine particulates from bigger pieces to be ground again to make the powder even more fine. In some embodiments of the present invention, the step of forming the powder is not necessary, as perhaps the powder was pre-manufactured and/or purchased, in which case the manufacturer simply obtains the powder and performs the next step of forming a dough from a powder. In such a case, the powder could be said to have been pre-made or pre-cooked, in that the steps of cooking the raw meat parts and forming a powderized low carbohydrate food product (as described elsewhere in this specification) is simply performed by someone else. Preferably, the powder is not in a gelatinous condition. For example, in another embodiment, the powder is not gelatinous and is not a paste nor a dough but is in the form of dry particles.

In another embodiment, the step of separating the dough into individual dough units comprises cutting using a cutting apparatus. In one embodiment, the cutting apparatus is at a temperature of preferably about 10 degrees Celsius to about 100 degrees Celsius, more preferably about 20 degrees Celsius to about 90 degrees Celsius, and most preferably about 60 degrees Celsius to about 80 degrees Celsius. In another embodiment, the cutting apparatus is at about the same temperature as the molding apparatus and mixing apparatus.

Preferably, the mixing apparatus and the shaping apparatus described in the method above are kept at a consistent temperature until the individual dough units are shaped prior to cooking. In one embodiment, both the mixing apparatus and the shaping apparatus are kept at about the same temperature as each other. In another embodiment, the mixing apparatus is kept at a consistent temperature and the shaping apparatus is kept at a consistent temperature, the temperatures between the two apparatus being different. In another embodiment, the step of mixing the dough could be performed in a mixing apparatus that is not at a temperature above about room temperature (about 20 degrees Celsius), and then transferring the dough to a holding apparatus that is at a temperature above about room temperature (about 20 degrees Celsius).

In another embodiment, the step of forming the dough and mixing the dough are a single step that occurs simultaneously.

In another embodiment, all of the surfaces in contact with the dough and/or individual dough units are heated.

In another embodiment, the individual dough units are baked and not fried.

The product of the low carbohydrate composition produced by the methods described can be considered "done" or "fully cooked" either by the amount of cooking time described by the various embodiments of the methods disclosed herein, or by the moisture content, for example, the moisture content of the cooked individual dough units. Preferably, the step of cooking the individual dough units is complete and the individual dough units fully cooked when the moisture content of the cooked individual dough units is between about 0.1% and about 15% moisture content, more preferably between about 1% and about 5% moisture content and most preferably between about 1.5% and 3.5% moisture content.

Examples

The invention is further illustrated by the following non-limiting examples.

Example 1

In a first example, taco shells, tostadas, and taco salad bowls, with low-carb content were made by cutting green pork skins into circular segments. The segments were rendered and then bent along a central axis and pressed and held in a "taco shell" shape as they were deep fried to form taco shells, and molded into bowls and held flat when fried to form tostadas and taco salad bowls.

Example 2

In a second example, one pound of pork masa was made and shaped into various low carbohydrate food products with curved shapes. About one pound (454 g) of pellet rendered from pork rinds made from back or belly skin was ground with a Ninja Chef blender (speed: Flour/Mill) until flakes looked granular or semi-fine like flour or a powder (about 1.5 minutes). The semi-fine powder flour was whisked through a strainer to separate the fine particulates from the bigger pieces that were ground again to obtain even finer flour.

Water (about 530 ml) was heated until it reached about 55° C. Hot water and pellet flour were combined in a Ninja Supra Kitchen System until dough was formed (about 2 minutes). Pork dough ball was transferred into a KitchenAide heated bowl set at about 70° C. (158° F.). The dough was mixed for about an additional 30 seconds. The dough was kept warm in the heated bowl for the duration of the tortilla making process. Dough balls were pulled from the dough to be about 1.5 inches in diameter (about 21 balls were formed per pound of pellet flour). The average weight of raw tortillas was about 28.5 grams.

A tortilla press was used to press the balls into tortilla discs (the final tortilla diameter was about 4.5 inches). To accomplish the taco shells, the unbaked tortillas were placed on a taco shell holder to give them a uniform folding form. The thickness of the taco shells averaged about 3.67 millimeters (0.367 centimeters).

Taco shells were baked in different types of oven: in an electric oven and in a convection oven at 232° C./450° F. The time of baking of each batch is listed below. The baking time in electrical and convection ovens for the various shapes were as follows:

| Shape | Time (minutes) | Oven Type |
| --- | --- | --- |
| Triangle | 21 | Electric |
| Tostadas | 21 | Electric |
| Taco shells | 21 | Electric |
| Taco shells | 15 | Convection |
| Circle bites | 21 | Electric |
| Circle bites | 7 | Convection |

Different shapes were accomplished by using a cookie cutter. The baking method and formulation does not necessarily change due to shape. The pork bites after baking were about 30.54 millimeters (3.054 cm) long and about 4.19 millimeters (0.419 cm) in thickness.

To confirm the benefits of the product of Example 2 versus currently available food products in the industry, various readings were taken of the products of Example 2.

A calorimeter reading was taken of the products produced by the method of Example 2 or similar method. The calorimeter reading compares the products of Example 2 to other existing food products to confirm the relatively low caloric properties of the products of Example 2. The calorimeter readings from low carbohydrate pork taco shells, pork tostadas, and flavored pork bites of Example 2 confirm their low caloric properties compared with commercial corn tostadas:

| Sample ID | Calorimeter Measurement | | |
|---|---|---|---|
| | (L*) | (C*) | (h) |
| Standard | 68.02 ± 0.731 | 41.73 ± 0.546 | 85.20 ± 0.102 |
| Tostada | 54.82 ± 0.182 | 33.85 ± 0.301 | 72.16 ± 0.125 |
| Taco shell | 53.81 ± 0.573 | 32.32 ± 0.577 | 71.76 ± 0.235 |

Standard = Mission corn tostadas.
L* = Lightness,
C* = Chroma,
h = Hue.
n = 3.
Tostada = Triangle form; made on Sep. 4, 2019; baked for 12 min. @ 450° F..
Taco shell = Made on Sep. 30, 2019; baked for 15 min. @ 450° F.

A texture profile analysis was performed of the products produced by the method of Example 2 or similar method. A texture profile analysis provides insight in how the food product behaves when chewed: test samples are compressed and data is taken that indicates how "crunchy" or "hard" the food product may feel to a person eating it. The texture profile analysis reading from low carbohydrate pork taco shells, pork tostadas, and flavored pork bites of Example 2 confirms the crunchiness of the products of Example 2 compared with commercial corn tostadas:

| Sample ID | Texture Analysis (N) |
|---|---|
| Standard | 13.77 ± 1.356 |
| Tostada | 57.80 ± 5.634 |
| Taco shell | 29.41 + 5.423 |
| Bites 1 | 37.06 ± 6.047 |
| Bites 2 | 37.06 ± 6.047 |
| Bites 3 | 50.41 ± 6.786 |

Standard = Mission corn tostadas.
N = Newtons,
n = 3.
Tostada = Triangle form; Sep. 4, 2019; baked for 12 min. @ 450° F..
Taco shell Sep. 30, 2019; baked for 15 min. @ 450° F..
Bites 1 = lemon pepper with chile flavor; Sep. 25, 2019; baked for 6 ½ min. @ 500° F..
Bites 2 = chipotle flavor; Sep. 25, 2019, baked for 6 ½ min. @ 500° F..
Bites 3 = lemon pepper with chile flavor; Sep. 30, 2019; baked for 7 min. @ 450° F..

A moisture content reading was performed of the products produced by the method of Example 2 or similar method. A moisture content reading provides insight into when the final product is cooked to the desired state and/or its consistency. The moisture content reading from low carbohydrate pork taco shells, pork tostadas, and flavored pork bites compared with commercial corn tostadas was as follows:

| Sample ID | Moisture Content (%) |
|---|---|
| Standard | 2.71 ± 0.270 |
| Tostada | 2.74 ± 0.465 |
| Taco Shell | 2.01 ± 0.225 |
| Bites 1 | 2.29 ± 0.555 |
| Bites 2 | 2.04 ± 0.548 |
| Bites 3 | 2.46 ± 0.206 |

Standard = Mission corn tostadas.
% = Percentage
n = 3
Tostada = Triangle form; Sep. 4, 2019; baked for 12 min. @ 450° F..
Taco shell Sep. 30, 2019; baked for 15 min. @ 450° F..
Bites 1 = lemon pepper with chile flavor; Sep. 25, 2019; baked for 6 ½ min. @ 500° F..
Bites 2 = chipotle flavor; Sep. 25, 2019, baked for 6 ½ min. @ 500° F..
Bites 3 = lemon pepper with chile flavor; Sep. 30, 2019; baked for 7 min. @ 450° F..

The preceding examples can be repeated with similar success by substituting the generically or specifically described components and/or conditions of this invention for those used in the preceding example.

Note that in the specification and claims, "about" or "approximately" means within twenty percent (20%) of the numerical amount cited. Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for producing a curve-shaped composition comprising pellet rendered from pork rinds, the method comprising:
    obtaining a powder comprising pellet rendered from pork rinds;
    forming a dough by adding, to the powder, water at a temperature of about 50 degrees Celsius to about 100 degrees Celsius, in an amount that turns the powder into a dough;
    mixing the dough in a mixing apparatus at a temperature of about 50 degrees Celsius to about 100 degrees Celsius and at about the same temperature as the step of forming the dough;
    separating the dough into an individual dough unit using a cutting apparatus at about the same temperature as the step of forming the dough and mixing the dough:
    shaping the individual dough unit into a curved shape using a shaping apparatus comprising a curved shape, wherein the shaping apparatus is at about the same temperature as the step of forming the dough and mixing the dough. and wherein the curved shape is one selected from the group consisting of taco shells, tostadas and taco bowls; and
    cooking the curved shape individual dough unit to produce a composition comprising the curved shape.

2. The method of claim 1 wherein the powder comprises only the pellet rendered from pork rinds and the composition does not include any bonding agent.

3. The method of claim 1 wherein pellet rendered from pork rinds of the powder is cooked prior to the step of obtaining a powder and the powder is in the form of dry particulates.

4. The method of claim 1 wherein the water is at a temperature of between about 50 degrees Celsius to about 60 degrees Celsius.

5. The method of claim 1 wherein the mixing apparatus is at a temperature of about 60 degrees Celsius to about 80 degrees Celsius.

6. The method of claim 1 wherein the shaping apparatus is at a temperature of about 60 degrees Celsius to about 80 degrees Celsius.

7. The method of claim 1 wherein the step of cooking comprises baking.

8. The method of claim 7 wherein the baking occurs at a temperature of about 225 degrees Celsius to about 250 degrees Celsius for between about 15 minutes to about 25 minutes.

9. The method of claim 1 further comprising adding a seasoning.

10. The method of claim 1 further comprising adding a food preservative.

11. The method of claim 1 wherein the powder is a gelatinous condition.

12. The method of claim 1 wherein about the same temperature of the dough and individual dough unit is maintained through each of the steps of mixing the dough, separating the dough into an individual dough unit, and shaping the individual dough unit.

13. A method for producing a curve-shaped composition comprising pellet rendered from pork rinds, the method comprising:

obtaining a powder produced from pellet rendered from pork rinds and that comprises only such pellet by grinding the pellet:

forming a dough by adding, to the powder, water at a temperature of about 50 degrees Celsius to about 60 degrees Celsius, in a ratio of powder to water of about one pound of powder to about 500 ml to 600 ml of water;

mixing the dough in a mixing apparatus at a temperature of about 60 degrees Celsius to about 80 degrees Celsius;

separating the dough into an individual dough unit using a cutting apparatus at about the same temperature as the step of mixing the dough;

shaping the individual dough unit into a curved shape by placing the individual dough unit into a shaping apparatus comprising a curved shape, the shaping apparatus maintained at about the same temperature as the steps of mixing the dough and separating the dough, wherein the curved shape is one selected from the group consisting of taco shells, tostadas and taco bowls; and baking the individual dough unit to produce a composition comprising the curved shape.

14. The method of claim 12 wherein the baked curve-shaped composition has a moisture content of between about 1.5% and about 3.5%.

* * * * *